United States Patent [19]

Zwaal

[11] 3,859,597

[45] Jan. 7, 1975

[54] SYSTEM FOR THE TRANSMISSION OF SIGNALS BY PULSE CODE MODULATION

[75] Inventor: Piet Zwaal, Hilversum, Netherlands

[73] Assignee: U.S. Philips Corporation, New York, N.Y.

[22] Filed: June 1, 1973

[21] Appl. No.: 366,058

[30] Foreign Application Priority Data

June 24, 1972 Netherlands ....................... 7208730

[52] U.S. Cl. ................ 325/38 B, 325/62, 332/11 D

[51] Int. Cl. ........................................... H03k 13/22

[58] Field of Search .................. 325/38 R, 38 B, 62; 179/15 AV; 340/347 A, 347 D; 332/11 D; 333/14

[56] References Cited

UNITED STATES PATENTS

| | | | |
|---|---|---|---|
| 3,500,441 | 3/1970 | Brolin | 179/15 AV |
| 3,727,005 | 4/1973 | Franaszek | 325/38 B |

*Primary Examiner*—Benedict V. Safourek
*Attorney, Agent, or Firm*—Frank R. Trifari; Simon L. Cohen

[57] ABSTRACT

A DCDM (digitally controlled delta modulation) transmission system provided with a transmitter and a receiver. The transmitter and the receiver are provided with a ringing generator and a ringing detector for generating and detecting a ringing signal which is generated in the transmitter with the aid of a pulse pattern generator constituted as a feed-back shift register which is at least partly constituted by the shift register already present in a dynamic control voltage generator in the DCDM transmission system for the purpose of dynamic control, while in the receiver the ringing detector generates a series of pulses in accordance with the received ringing pulse pattern and is also provided with a shift register which is at least partly constituted by the shift register already present in the dynamic control voltage generator in the receiver.

4 Claims, 3 Drawing Figures

SYSTEM FOR THE TRANSMISSION OF SIGNALS BY PULSE CODE MODULATION

The invention relates to a system for the transmission in a given transmission band of continuously varying information signals by means of companded delta modulation, said system comprising a transmitter and a receiver, the transmitter comprising: a delta modulation compressor; a ringing generator for generating a ringing signal having a frequency within said transmission band and being transmitted to said receiver, a pulse code modulator connected to a clock pulse generator for producing output pulses which are transmitted to the cooperating receiver and which are also applied to a local receiver provided with an integrating nerwork, said network producing a comparison signal; a difference producer, said comparison signal and said information signal being applied thereto, said difference producer producing a difference signal controlling the pulse code modulator. The receiver comprising a delta modulation expander and a signalling signal detector; said delta modulation compressor and said expander each comprising a dynamic control device which is controlled by a control voltage generated by a pulse pattern analyzer which is provided with a shift register coupled to the output of the pulse code modulator and which comprises at least three shift register elements whose contents is shifted in the rhythm of the pulses originating from the clock pulse generator.

In such a transmission system particularly used in, for example, a telephone system for the transmission of speech signals between two subscribers or between a subscriber and a main station, the ringing signal generated by the ringing signal generator is transmitted for the purpose of establishing a telephone connection and is detected in the receiver by the ringing signal detector, which ringing signal detector controls a ringing device, for example as bell, in accordance with this received ringing signal.

The invention has for its object to provide in a transmission system of the kind described in the preamble a ringing signal generator and a ringing signal detector which are completely built up from digital structural elements, in which the ringing signal is transmitted in the transmission band of the speech signal, which generator and detector are particularly very suitable as a simple embodiment of an integrated circuit.

According to the invention, the ringing generator in the transmitter comprises a pulse pattern generator controlled by said clock pulse generator for generating a periodic pulse pattern within which the pulses assume a first and a second of two binary values, occur in an irregular alternation and coincide with the successive pulses generated by the clock pulse generator, said pulse pattern generator being constituted by a cascade arrangement of at least one modulo-2-adder and at least one shift register element connected to the output of one of the shift register elements of the shift register associated with said pulse pattern analyzer in the transmitter the input of said pulse pattern generator being connected to a switch having a shift register input terminal coupled to the output of the pulse code modulator and a pulse pattern generator input terminal connected to the output of the cascade arrangement, said output being also connected to a second input of the modulo-2-adder, the pulses to be transmitted in said transmitter being derived from a shift register element associated with both the said shift register and with said pulse pattern generator, the transmitted signals in the receiver of said transmission system being applied to the ringing signal detector which generates a series of pulses in accordance with the received signalling signal.

The invention and its advantages will now be described in greater detail with reference to the Figures.

Figure 1:
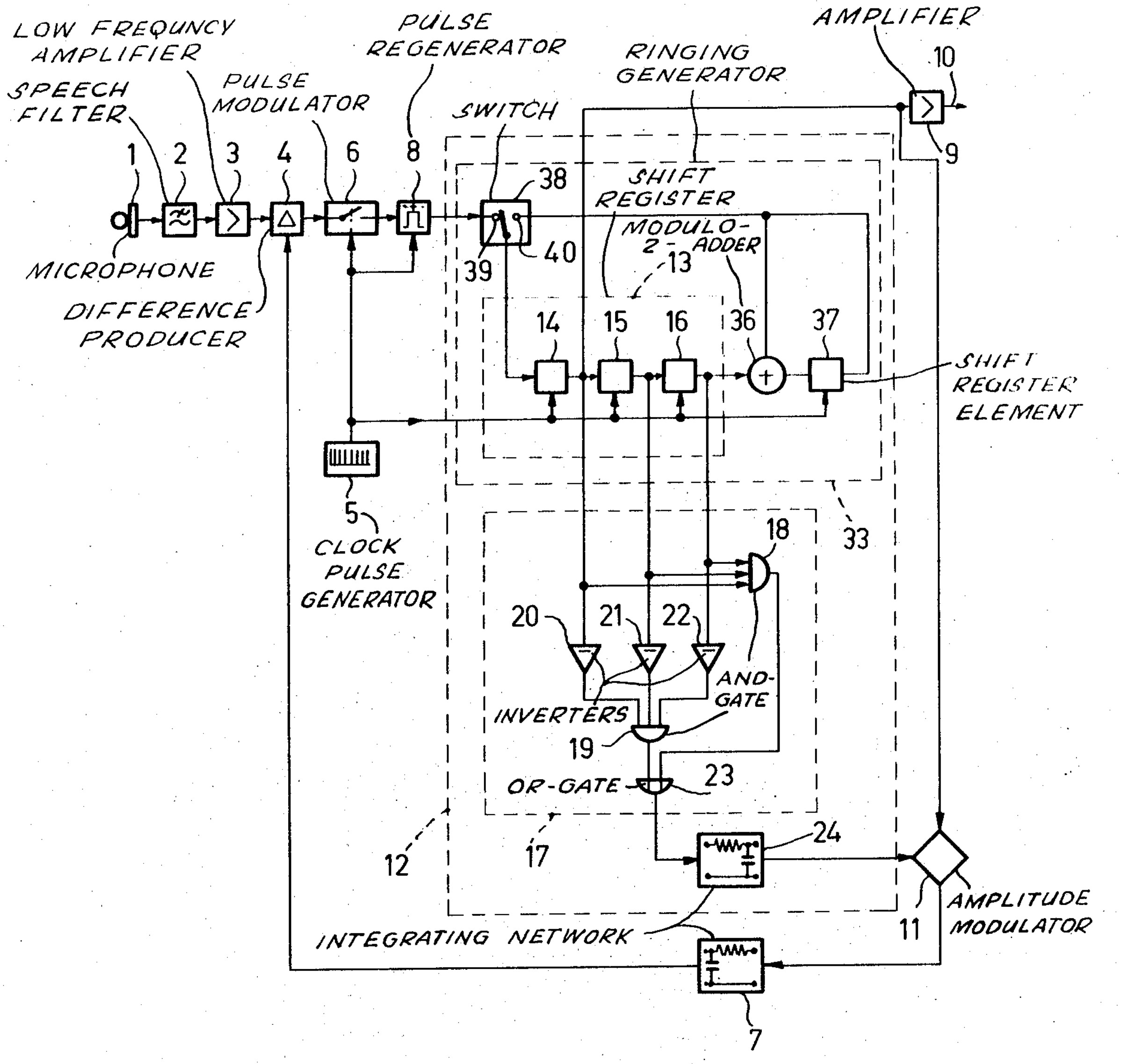
FIG. 1 shows a transmitter according to the invention.

The transmitter according to the invention shown in FIG. 1 is adapted for the transmission of speech signals which are derived from a microphone 1 and are applied to a difference producer 4 through a speech filter 2 having a passband of, for example, 0.3 – 3.4 kHz and a low-frequency amplifier 3.

A comparison signal for forming a difference voltage which controls a pulse modulator 6 connected to a clock pulse generator 5 is also applied to this difference producer 4. More particularly in this embodiment the clock pulse generator 5 supplies a series of equidistant pulses having a repetition frequency which is larger than the highest speech frequency to be transmitted. Said comparison signal is derived from an integrating network 7 coupled to the output of the pulse modulator 6.

Dependent on the polarity of the output voltage of the difference producer 4, the output pulses from the clock pulse generator 5 are either passed or suppressed by the pulse modulator 6. The passed pulses are subsequently applied to a pulse regenerator 8 for the suppression of variations in amplitude, duration, shape or instant of occurrence of the pulses produced in the pulse modulator 6. These regenerated pulses are applied after amplification in an end-stage amplifier 9 through a lead 10 (possibly after carrier modulation) to the cooperating receiver and are also applied to a local receiver provided with said integrating network 7.

The system described continuously has the tendency to render the difference voltage zero so that the comparison signal constitutes a quantized approximation of the input signal.

In order to reduce the disturbing influence on the reproducing quality caused by this quantization of the signal to be transmitted, the amplitude of the pulses applied to the integrating network 7 is varied in an amplitude modulator 11 by means of a dynamic control voltage which is generated by a dynamic control voltage generator 12 comprising a pulse pattern analyzer controlled by the output pulses from the pulse modulator 6 and having the form of a shift register 13 coupled to the output of the pulse modulator 6 and being provided with at least three shift register elements whose contents are shifted in synchronism with the pulses originating from the clock pulse generator 5, all this as described in greater detail in U.S. Pat. No. 3,729,678.

More particularly in this embodiment the shift register 13 is connected to the output of the pulse regenerator 8 and it is constituted by three shift register elements 14–16 whose outputs are connected to a network 17 whose output is connected through an integrating network 24 to an input of the amplitude modulator 11.

Since a correct understanding of the operation of this network 17 is not imporatant for satisfactorily understanding the invention, reference is only made in this respect that this network 17 shown in FIG. 1 is constituted by an AND gate 18 to which the outputs of said shift register elements 14–16 are directly applied and by an AND gate 19 to which these outputs are applied through inverters 20–23. The outputs of these AND gates 18 and 19 are connected to inputs of and OR gate 23 whose output signal is applied through the integrating network 24 to the amplitude modulator 11.

The presence or absence of previously determined pulse patterns, in this embodiment in the form of three equal pulses, is analyzed every time between two successive clock pulses originating from the clock pulse generator 5 with the aid of the dynamic control voltage generator 12. Whenever such a pulse pattern occurs a pulsatory output voltage is derived from the network 17, which output voltages supply a dynamic control voltage after integration in the integrating network 24. The dynamic control voltage causes the amplitude of the pulses derived from the amplitude modulator 11 to vary in accordance with this dynamic control voltage.

Figure 2:
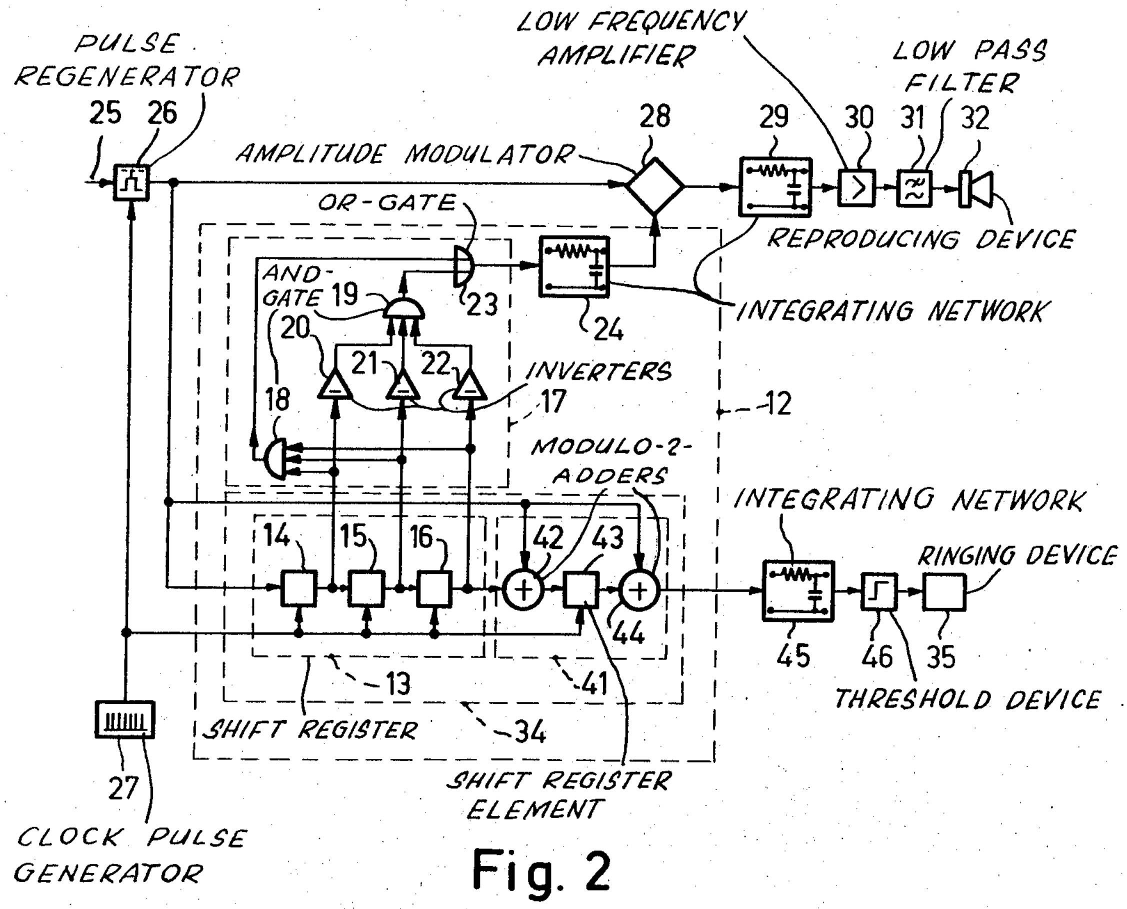
FIG. 2 shows a receiver cooperating with this transmitter according to FIG. 1.

FIG. 2 shows a receiver to be used with the transmitter of FIG. 1 in which the elements corresponding to those in FIG. 1 have the same reference numerals. The received pulse signals applied through the lead 25 to the receiver are applied to a pulse regenerator 26 which is controlled by a clock pulse generator 27 synchronized with the clock pulse generator 5 in the transmitter. The regenerated pulses are applied at one end to a dynamic control voltage generator 12 likewise provided with a shift register 13 and a network 17 for generating a dynamic control voltage which together with the regenerated pulses is applied to an amplitude modulator 28 including an integrating network 29 connected to its output whose output signal is applied through a low-frequency amplifier 30 and a lowpass filter 31 to a reproducing device 32.

Particularly when using such a transmission system in telephone systems, a ringing signal is generated in the transmitter with the aid of a so-called ringing generator 33. The generated signalling signal is transmitted through the transmission path to the receiver and is there detected by a so-called ringing detector 34 which controls a ringing device 35 in accordance with the received ringing signal.

In order to realize a ringing detector and a ringing generator with a minimum number of components in a very simple manner in such a transmission system, the ringing generator 33 in the transmitter according to the invention is provided with a pulse pattern generator controlled by said clock pulse generator 5 for generating a periodic pulse pattern within which the pulses assume a first and a second of two binary values, occur in an irregular alternation and coincide with the successive clock pulses generated by the clock pulse generator 5, said pulse pattern generator being constituted by a cascade arrangement of at least one modulo-2-adder 36 and at least one shift register element 37 connected to the output of one of the shift register elements of the shift register 13 associated with the pulse pattern analyzer in the transmitter. The input of this pulse pattern generator is connected to a switch 38 which is provided with a shift register input terminal 39 coupled to the output of the pulse code modulator 6 and a pulse pattern generator input terminal 40 coupled to the output of the cascade arrangement, which output is also connected to a second input of said modulo-2-adder 36. In this transmitter the pulses to be transmitted are derived from a shift register element associated with both said shift register 13 and said pulse pattern generator 33.

In the embodiment shown said cascade arrangement, which consists of only one modulo-2-adder 36 and only one shift register element 37 connected to its output, is connected to the third shift register element 16 of the shift register 13, while the output of this pulse pattern generator is connected to the output of the first shift register element 14 of the shift register 13. The input of this shift register element 14 can be connected by means of the switch 38 either through the shift register terminal 39 to the output of the pulse regenerator 8 or through the pulse pattern generator terminal 40 to the output of the shift register element 37.

When in the transmitter shown the input of the shift register 13 is connected through the shift register terminal 39 to the output of the pulse regenerator 8 the output pulses from the pulse code modulator 6 are not only applied to the shift register 13 through the shift register element 14 but also to the transmission amplifier 9 through which they are transmitted to the receiver. When, on the other hand, the input of the shift register 13 is connected through the pulse pattern generator input terminal 40 to the output of the shift register element 37, the transmission of the output pulses from the pulse modulator 6 is prevented, but a pulse pattern generator is obtained in the form of a fed-back shift register provided with a modulo-2-adder 36 and constituted by the shift register elements 14, 15, 16 and 37. The output of this shift register is not only fed back to its input but also to a second input of the modulo-2-adder 36. When the possible binary values of a pulse are indicated by 0 and 1, the pulse pattern 100011110101100 comprising 15 pulses is generated by the pulse pattern generator shown. This pulse pattern, generated in the indicated way is known as a maximum length shift register sequence, is transmitted as a ringing signal to the receiver and has the property that it can satisfactorily be distinguished from the transmitted information pulses because it is uncorrelated therewith.

The receiver cooperating with the above-described transmitter and shown in FIG. 2 is adapted for detecting said pulse pattern and to this end it is provided with a ringing signal detector 34 which, in accordance with the received ringing pulse pattern, provides a series of pulses which coincide with the clock pulses originating from the clock pulse generator 27.

More particularly in this embodiment the detector 34 is constituted by a cascade arrangement of the shift register elements 14–16 of the shift register 13 and the output of the shift register element 16 is connected to the input of a cascade arrangement 41 of a first modulo-2-adder 42, a shift register element 43 likewise controlled by the clock pulse generator, and a second modulo-2-adder 44. A second input of these modulo-2-adders 42 and 44 is connected to the input of the shift register 13. The output of this ringing detector is constituted by the output of the modulo-2-adder 44 which output is connected through a network 45 integrating the output pulses from this adder 44 and a threshold device 46 to the input of the ringing device 35.

The ringing detector 34 shown constitutes a so-called inverse pulse pattern generator which more particularly converts the received ringing pulse pattern generated by the pulse pattern generator in the transmitter into a series of pulses whose instants of occurrence coincide with the successive pulses originating from the clock pulse generator 27, which pulses are integrated in the integrating network 45 whose output voltage energizes, for example, a relay after exceeding the threshold value in the ringing device 35 given by the threshold device 46.

Thus, a transmission system is realized in which the shift registers 13 in the transmitter and the receiver are not only utilized for the purpose of the pulse group analysis for generating a dynamic control voltage but these shift registers 13 are also utilized for generating or detecting a ringing signal and thus a ringing generator and a ringing detector are realized in a very simple manner exclusively using digital structural elements and being in addition very suitable for a simple embodiment as an integrated circuit.

Figure 3:
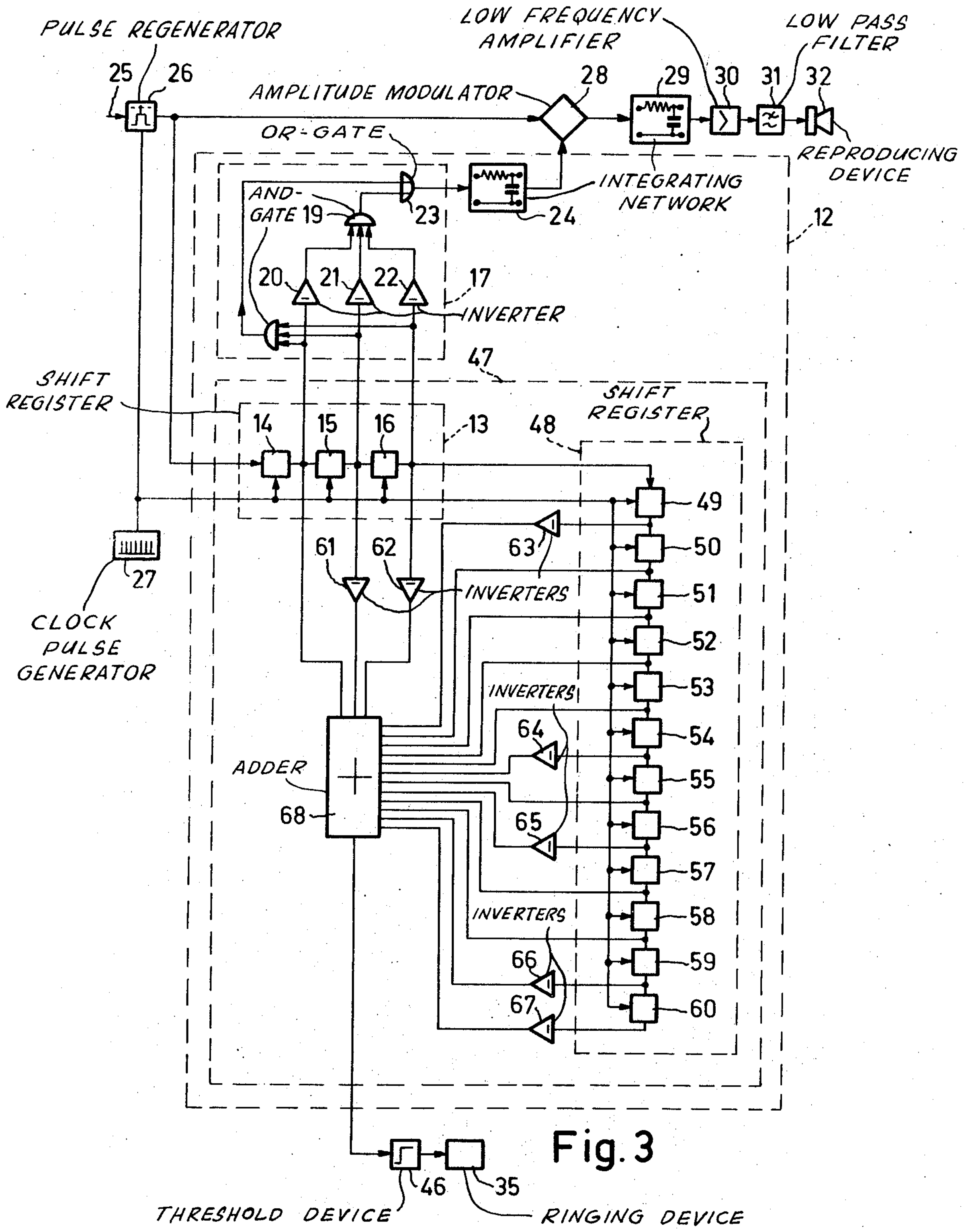
FIG. 3 shows a modification of the receiver shown in FIG. 2.

FIG. 3 shows a modification of the ringing detector which differs from the detector shown in FIG. 2 in that it only provides an output signal if all pulses of the ringing pulse pattern are received. More particularly, the ringing detector shown is constituted by a so-called matched filter 47 which in this embodiment is provided with 15 shift register elements for detecting the ringing pulse pattern 100011110101100 composed of 15 pulses and transmitted by the transmitter of FIG. 1. To this end, a second shift register 48 is arranged in cascade with the shift register 13 associated with the pulse pattern analyzer, which second shift register consists of twelve shift register elements 49–60 likewise controlled by the clock pulse oscillator 27. The outputs of the shift register elements 14–16, 49–60 of the shift register thus obtained and built up from 15 shift register elements are connected in the manner as shown in the Figure for the purpose of detecting said ringing pulse pattern 100011110101100 either directly or through inverters 61–67 to the parallel inputs of a linear combination device 68 whose output is connected to the input of the threshold device 46.

More particularly, the threshold device exclusively provides a pulse when the transmitted ringing pulse pattern 100011110101100 is written in the cascade arrangement of shift registers 13 and 48 in which case, for example, exclusively positive voltages are applied to the inputs of the combination device 68, which voltages after superimposition in the combination device produce an output voltage having a level which is higher than the threshold level of the threshold device. However, when the ringing pulse pattern is not written in the cascade arrangement of the shift registers 13 and 48, both positive and, for example, negative voltages are applied through its inputs to the combination device 68 and an output voltage which is located below said threshold value is obtained by superimposition.

It is to be noted that the number of shift register elements in the ringing generator and hence in the ringing detector can be extended in a simple manner. This is, however, generally accompanied by an increase in the length of the generated pulse series. Alternatively, a threshold value may be chosen for the threshold device 46 having such a value that also those ringing patterns of which one or more pulses are lost due to transmission generate a voltage at the output of the threshold device which voltage controls the ringing device.

What is claimed is:

1. A system for the transmission in a given transmission band, continuously varying information signals by means of companded delta modulation, said system being of the type comprising a transmitter and a receiver, the transmitter comprising a delta modulation and a receiver, the transmitter comprising a delta modulation compressor; a ringing generator for generating a ringing signal having a frequency within said transmission band, being transmitted to said receiver; a clock pulse generator, a pulse code modulator connected to said clock pulse generator for producing output pulses, means for transmitting the output pulses to the cooperating receiver and which are also applied to a local receiver provided with an integrating network, said network producing a comparison signal; a difference producer, said comparison signal and said information signal being applied thereto, said difference producer producing a difference signal controlling the pulse code modulator; said receiver comprising a deltamoduation expander, a pulse pattern analyzer and a ringing signal detector, said deltamodulation compressor and said expander each comprising a dynamic control device which is controlled by a dynamic control voltage generated by said pulse pattern analyzer, said pulse pattern analyzer being provided with a shift register coupled to the output of the pulse code modulator and comprising at least three shift register elements whose contents is shifted in synchronism with the pulses originating from the clock pulse generator, the improvement wherein the ringing signal generator in the transmitter comprises a pulse pattern generator controlled by said clock pulse generator for generating a periodic pulse pattern within which the pulses assume a first and a second of two binary values, occur in an irregular alternation and coincide with the successive pulses generated by the clock pulse generator, said pulse pattern generator being constituted by a cascade arrangement of at least one modulo-2-adder and at least one additional shift register element connected to the output of one of the shift register elements of the shift register associated with said pulse pattern analyzer in the transmitter, a switching device having a shift register input terminal coupled to the output of the pulse code modulator and a pulse pattern generator input terminal connected to the output of the cascade arrangement, the input of said pulse pattern generator being connected to said switching device said output of the cascade arrangement being likewise connected to a second input of the modulo-2-adder, the pulses to be transmitted in said transmitter being derived from one of the shift register elements associated with both the said shift register of said pulse pattern analyzer and with said pulse pattern generator, the transmitted signals in the reciever of said transmission system being applied to the ringing signal detector which generates a series of pulses in accordance with the received ringing signal.

2. A transmission system as claimed in claim 1, characterized in that the ringing signal detector is constituted by a cascade arrangement of a first and second modulo-2-adder connected to the output of one of the shift register elements of the shift register associated with the pulse pattern analyzer in the receiver, at least one shift register element being incorporated between said modulo-2-adders and being controlled by the pulses originating from the clock pulse generator in the receiver, the number of shift register elements of said ringing signal detector preceding the first modulo-2-adder and incorporated between the two modulo-2-adders being equal to the number of shift register elements preceding and following said modulo-2-adder in the ringing signal generator.

3. A transmission system as claimed in claim 1, characterized in that said ringing signal detector is constituted by a matched filter comprising a shift register having a number of shift register elements corresponding to the number of pulses in the transmitted ringing signal, the outputs of said shift register elements being coupled to a linear combination device including a threshold device connected to its output.

4. A transmission system as claimed in claim 1, characterized in that the shift register associated with the matched filter is constituted by the cascade arrangement of said shift register associated with the pulse pattern analyzer and a second shift register.

* * * * *

)-1050
;/69)

UNITED STATES PATENT OFFICE
CERTIFICATE OF CORRECTION atent No. 3,859,597 Dated January 7, 1975 nventor(s) PIET ZWAAL

It is certified that error appears in the above-identified patent nd that said Letters Patent are hereby corrected as shown below:

IN THE SPECIFICATION

:ol. 3, line 9, "and" second occurence should be --an--;

line 43, "signalling" should be --ringing--;

IN THE CLAIMS

:laim 1, line 6, cancel in its entirety;

line 7, cancel "ulation";

line 47, after "device" insert -- , --(a comma);

Signed and sealed this 11th day of March 1975.

SEAL)
ttest:

JTH C. MASON
ttesting Officer

C. MARSHALL DANN
Commissioner of Patents
and Trademarks